United States Patent [19]

Michalski

[11] Patent Number: 5,822,275
[45] Date of Patent: Oct. 13, 1998

[54] METHOD AND APPARATUS FOR FIXED TARGET ECHO SUPPRESSION IN DISTANCE MEASUREMENT ON THE PRINCIPLE OF PULSE TRANSIT TIME

[75] Inventor: Bernhard Michalski, Maulburg, Germany

[73] Assignee: Endress & Hauser GmbH & Co., Maulburg, Germany

[21] Appl. No.: 738,970

[22] Filed: Oct. 24, 1996

[30] Foreign Application Priority Data

Oct. 27, 1995 [DE] Germany .................. 195 40 170.0

[51] Int. Cl.[6] .............................. G01S 15/00; G01S 7/52
[52] U.S. Cl. ................................... 367/99; 367/908
[58] Field of Search ................. 367/99, 908; 73/290; 128/661.08; 342/123

[56] References Cited

U.S. PATENT DOCUMENTS

| | | | |
|---|---|---|---|
| 4,418,340 | 11/1983 | Maeshiba | 340/618 |
| 4,890,266 | 12/1989 | Woodward | 367/99 |
| 5,320,105 | 6/1994 | Bonnefous et al. | 128/661.08 |
| 5,323,361 | 6/1994 | Elle et al. | 367/98 |
| 5,587,969 | 12/1996 | Kroemer et al. | 367/99 |
| 5,631,875 | 5/1997 | Romes et al. | 367/99 |

FOREIGN PATENT DOCUMENTS 0 340 953  11/1989  European Pat. Off. .
2 050 022  12/1980  United Kingdom .

OTHER PUBLICATIONS

Schrank, W. (Sep. 1988), Fuellstandsmessung mit intelligenten Ultraschallmessgeraeten, Messen Pruefen Automatisieren, pp. 443–447.

*Primary Examiner*—Ian J. Lobo
*Attorney, Agent, or Firm*—Bose McKinney & Evans

[57] ABSTRACT

In distance measurement on the principle of pulse transit time in each measurement cycle in a transmitting phase a transmission pulse having a given transmission frequency is emitted and in a subsequent receiving phase the envelope of the received signals is formed to determine the transit time of the useful echo pulse. For suppressing the fixed target echoes a broken line of several segments surrounding the envelope of the fixed target echo is formed for each fixed target echo. For each segment, information as to the amplitude of the end point of the segment, as to the changing direction and slope of the segment, as well as for the first segment information as to the point in time of the start of the first segment in the measurement cycle are stored. In the course of the measurement cycle as of the point in time of the start of the first segment, for each segment, counting pulses having a repetition frequency dictated by the slope information are counted in a counting direction dictated by the direction information up to achieving a count dictated by the amplitude information. In the course of the measurement cycle each current count is used to control fixed target echo suppression.

11 Claims, 4 Drawing Sheets

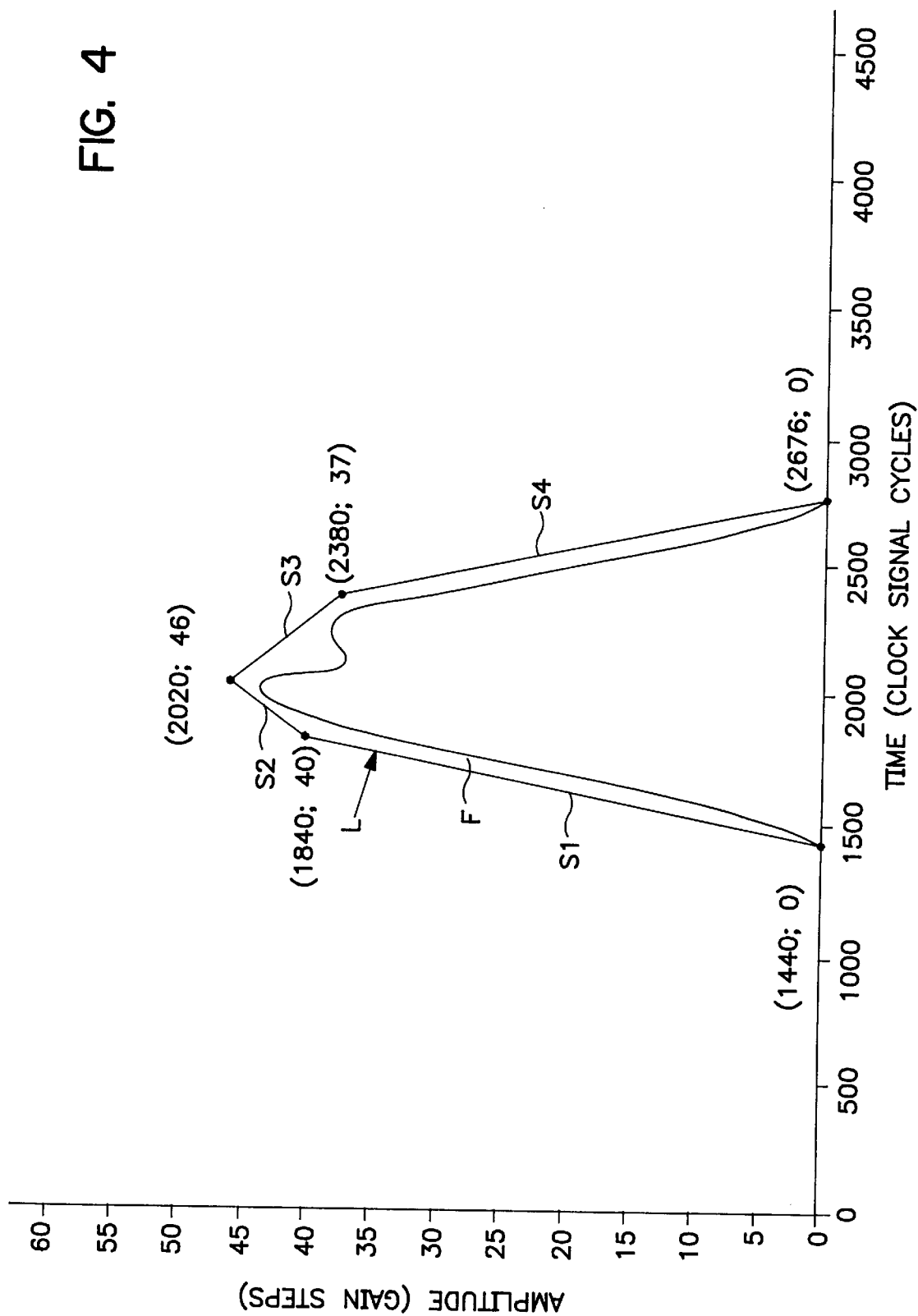

METHOD AND APPARATUS FOR FIXED TARGET ECHO SUPPRESSION IN DISTANCE MEASUREMENT ON THE PRINCIPLE OF PULSE TRANSIT TIME

BACKGROUND OF THE INVENTION

1. Field of the Invention

The invention relates to a method for fixed target echo suppression in distance measurement based on the principle of pulse transit time in which, in each measurement cycle, in a transmitting phase a transmission pulse having a given transmission frequency is emitted and in a subsequent receiving phase the envelope of the received signals with the transmission frequency is formed to determine the transit time of the useful echo pulse and to compute therefrom the distance to be measured, and wherein prior to the measurement, information as to fixed target echoes is acquired and stored for use in each measurement cycle for suppressing the fixed target echoes.

2. Description of the Prior Art

Methods of this kind are known from U.S. Pat. No. 4,890,266 A1 and from DE 42 18 303 C1. In these known methods an echo profile of the received signals and a threshold profile containing the fixed target echoes are formed and stored. Only those components of the echo profile exceeding the threshold profile are then subjected to evaluation. Storing the profiles necessitates, however, a very large storage capacity.

SUMMARY OF THE INVENTION

The object of the invention is to define a method of the aforementioned kind which permits fixed target echo supression with a very low storage requirement.

In accordance with the invention this object is achieved by acquiring and sorting the information for a fixed target echo as a broken line made up of several straight segments surrounding the envelope of the fixed target echo. For each segment, information as to the amplitude of the end point of the segment, information as to the changing direction of the segment and information as to the slope of the segment. For the first segment, information as to the point in time of the start of the first segment in the measurement cycle is also stored. In the course of each measurement cycle, as of the point in time of the start of the first segment, for each segment counting pulses having a repetition frequency dictated by the slope information are counted in a counting direction dictated by the direction information up to achieving a count dictated by the amplitude information of the endpoint of the segment. In the course of the measurement cycle the current count is used to control fixed target echo supression.

The storage requirement for storing the information relevant to each segment of the broken line is very low. The stored information is directly processed in the course of each measurement cycle and applied to the arriving received signals so that fixed target suppression materializes without an echo profile of the received signals being needed. Accordingly, the storage requirement for such an echo profile is eliminated.

The method according to the invention permits fixed target echo suppression in two different modes. The one mode consists of the gain of an amplifier amplifying the received signals being adjusted as a function of the current count in the course of the measurement cycle so that the amplitude of an envelope signal corresponding to the broken line describing a fixed target echo does not exceed a given threshold value.

The other mode consists of blocking the evaluation of the envelope signal as a function of the current count in the course of the measurement cycle in a time span in which the amplitude of an envelope signal corresponding to the broken line describing a fixed target echo would exceed a given threshold value.

An apparatus for implementing the method according to the invention comprising means for emitting a transmission pulse in the transmitting phase of each measurement cycle and a signal processing circuit for processing the received signals received in the receiving phase following the transmitting phase in each measurement cycle. The signal processing circuit containing an analog subcircuit for amplifying and filtering the received signals and for forming the envelope of the received signals. The signal processing circuit containing a distance counter which, in the course of the measurement cycle, continuously counts the cycles of a clock signal as a measure of the time elapsed since the commencement of the measurement cycle. The signal processing circuit characterizes the fixed target echo to be suppressed as a broken line composed of segments which are stored in a fixed target circuit. The fixed target circuit containing a fixed target memory in which the amplitude information, the direction information and the slope information are stored for all segments of the broken line in the form of a table which contains a row for each segment, and each fixed target circuit contains a fixed target start register in which the information as to the time point of commencement of the first segment in the measurement cycle is stored. A distance counter counts time elapsed in the measurement cycle. A fixed target start comparator continuously compares the information stored in the fixed target start register to the count of the distance counter. When the value of the distance counter equals the fixed target start time, the fixed target start comparator activates row-by-row processing of the information stored in the fixed target memory.

Advantageous aspects and further embodiments of the method according to the invention and of the apparatus for its implementation are characterized in the sub-claims.

BRIEF DESCRIPTION OF THE DRAWING

Further features and advantages of the invention will be appreciated from the following description of an example embodiment with reference to the drawings in which:

FIG. 4 is a time plot for explaining the functioning of the fixed target circuit of FIG. 3.

DESCRIPTION OF THE PREFERRED EMBODIMENT

Figure 1:
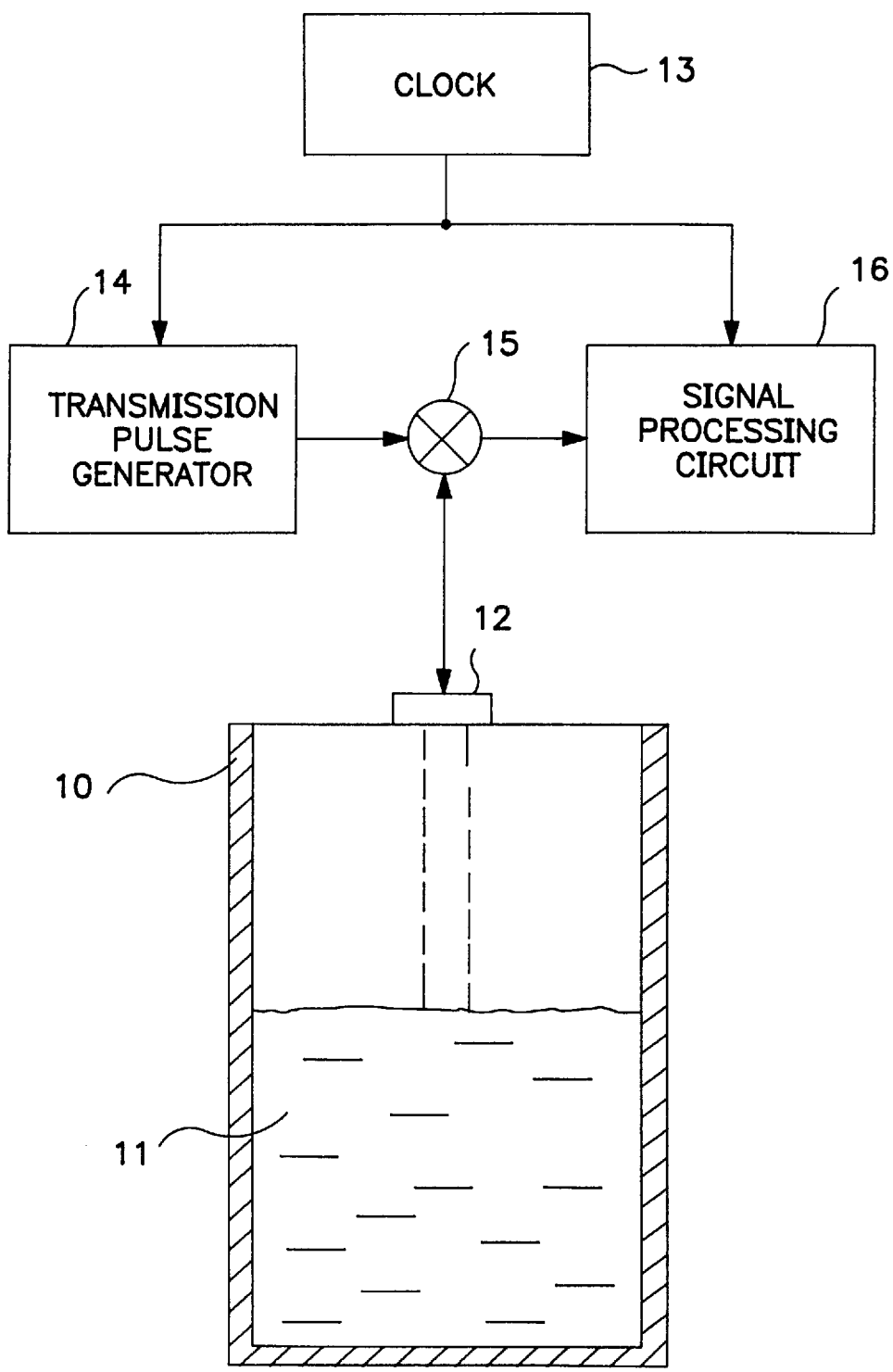
FIG. 1 is a schematic illustration for explaining distance measurement on the principle of pulse transit time by way of an example in measuring the level in a container by means of ultrasonic pulses.

FIG. 1 shows an example of a ranging apparatus based on the principle of pulse transit time for measuring the level in a container 10 containing a material 11. On the upper side of the container 10, above the highest level anticipated, an ultrasonic transducer 12 is arranged which operates alternately as a transmitting transducer and as a receiving transducer. In the transmission phase the ultrasonic transducer 12 is excited by an electrical signal so that it generates an ultrasonic pulse oriented perpendicular downwards to the material 11 contained in the container. In the receiving phase the ultrasonic transducer 12 receives the echo signal reflected at the surface of the material 11 which it converts into an electrical signal. A transmission phase and a receiving phase form together a measurement cycle. A clock 13 controls the time sequence of the measurement cycles and the time sequence of the events within each measurement cycle.

A transmission pulse generator 14 activated by the clock 13 at the commencement of each measurement cycle generates during the transmission phase a pulse-shaped electrical signal necessary for exciting the ultrasonic transducer 12, having the frequency of the ultrasonic wave to be transmitted. This signal is applied to the ultrasonic transducer 12 via a duplexer 15. All ultrasonic signals arriving at the ultrasonic transducer 12 on ceasement of the transmission pulse are converted therein into an electrical received signal which is applied to a signal processing circuit 16 via the duplexer 15. Included in these received ultrasonic signals is the useful echo pulse reflected at the surface of the material 11, the transit time of which from the ultrasonic transducer 12 to and from the material surface back to the ultrasonic transducer 12 is to be measured. From this transit time the distance of the material surface from the ultrasonic transducer 12 and thus the level in the container 10 can be determined.

Also included in the ultrasonic signals received by the ultrasonic transducer 12 are, in addition to the useful echo pulse, unwanted echo signals reflected by fixed objects in the container, this being the reason why these are termed "fixed target echoes". one salient task of the signal processing circuit 16 consists of detecting the useful echo pulse from the entirety of the ultrasonic signals received so that a false ultrasonic signal is not interpreted as being the useful echo pulse used in measuring the transit time. For this purpose it is necessary to suppress the fixed target echoes in the received signal.

Figure 2:
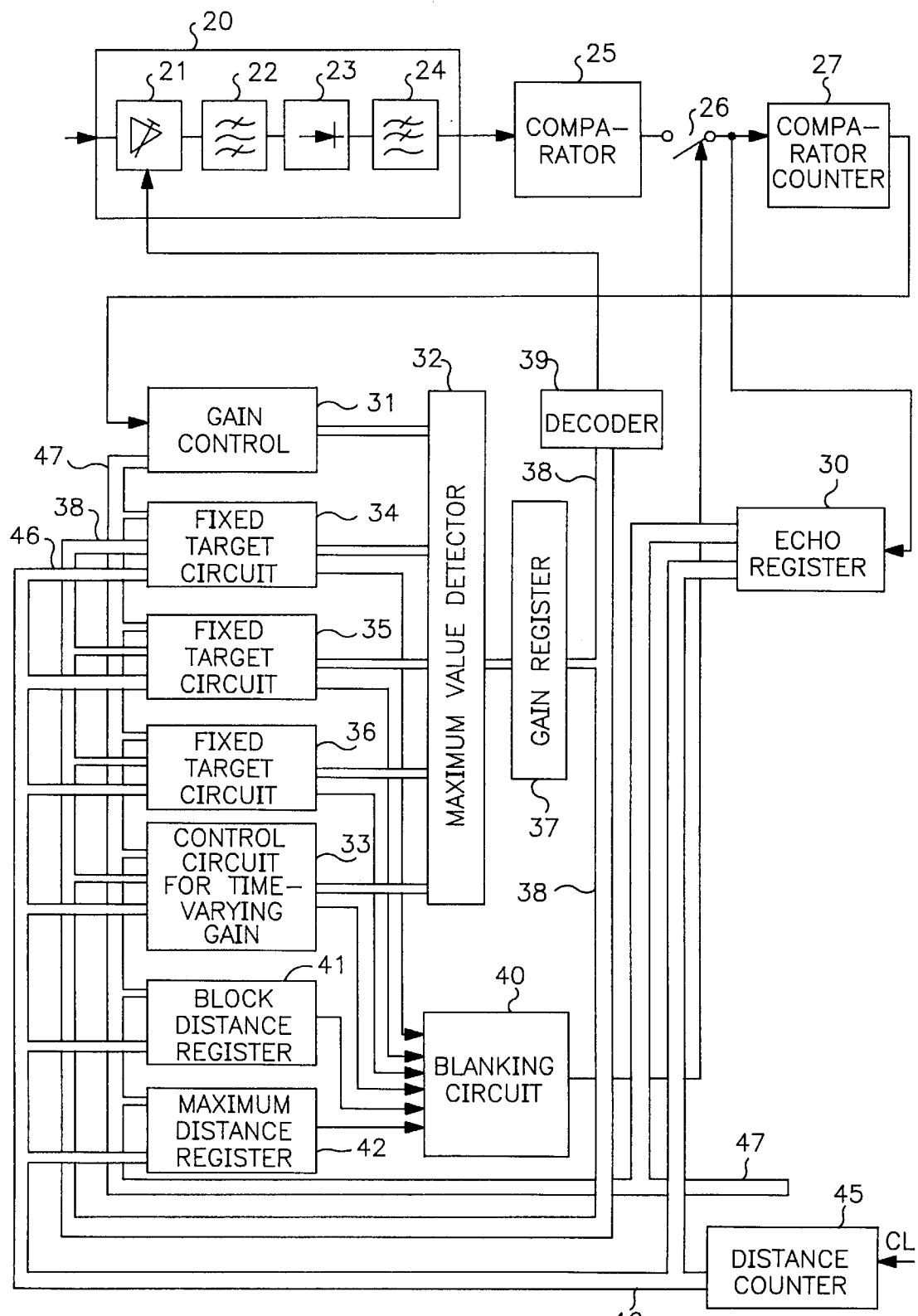
FIG. 2 is a block diagram of the signal processing circuit of the apparatus in FIG. 1.

FIG. 2 shows the block diagram of an embodiment of the signal processing circuit 16 in which special means are provided to suppress the fixed target echoes. The signal processing circuit of FIG. 2 contains an analog subcircuit 20 to which the received signal furnished by the ultrasonic transducer 12 is applied. The analog subcircuit 20 contains in sequence a variable-gain amplifier 21, a bandpass filter 22, a rectifier 23 and a low pass filter 24. The amplifier 21 amplifies the received signal furnished by the ultrasonic transducer 12 by a gain which is adjustable in 64 discrete steps. The bandpass filter 22 is tuned to the frequency of the ultrasonic wave and filters from the received signal the frequency range containing the echo signals. The amplified and filtered received signal is rectified by the rectifier 23 which in conjunction with the output low pass filter 24 forms the envelope signal of the received signal. The envelope signal is applied from the output of the low pass filter 24 to a comparator 25 in which it is compared to a fixed threshold value. Every time the threshold value is exceeded the comparator 25 outputs a pulse which is applied via a normally closed enable switch 26 to a comparator counter 27, on the one hand, and to an echo register 30 on the other. The count of the comparator counter 27 is increased by one unit every time the threshold value is exceeded and applied to a gain control 31 in which it is used for an internal gain control. The gain control 31 furnishes at the output a digital data word, indicating the gain to be set, to a maximum value detector 32.

The maximum value detector 32 receives further data words indicating the gain to be set, from a control circuit 33 for time-varying gain which serves to compensate the attenuation of the echo signals as a function of the transit time, as well as from three fixed target circuits 34, 35 and 36. The maximum value detector 32 continuously establishes from the five supplied data words the data word having the highest numerical value and furnishes this data word at its output to a gain register 37 which thus always contains the data word indicative of the current gain value. It is to be noted that the data word having the highest numerical value corresponds to the lowest gain, since each data word indicates the amount by which the gain of the amplifier 21 is to be diminished from the maximum value. The data word stored in the gain register 37 is applied via a bus 38 to a decoder 39 which generates a gain control signal for adjusting the gain of the amplifier 21 so that it corresponds to the data word held in the gain register 37. Also connected to the bus 38 are the three fixed target circuits 34, 35, 36 and the control circuit 33 for time-varying gain.

The control circuit 33 and each of the fixed target circuits 34, 35 and 36 may furnish, instead of the gain data word, at a further output a blanking signal to a blanking circuit 40. When the blanking circuit 40 receives a blanking signal it opens the enable switch 26 which open circuits the connection of the output of the comparator 25 to the comparator counter 27 and the echo register 30, preventing evaluation of the envelope signal furnished by the analog subcircuit 20.

The blanking circuit 40 receives further blanking signals from a block distance register 41 and a maximum distance register 42. The blanking signal furnished by the block distance register 41 blocks, by opening the enable switch 26, the evaluation of the envelope signal during the ringdown time of the ultrasonic transducer 12 following the end of the transmission pulse. The blanking signal furnished by the maximum distance register 42 blocks, by opening the enable switch 26, the evaluation of the envelope signal in the range lying beyond the maximum distance to be measured.

A distance counter 45 serves as a time reference for signal processing. It is set to zero prior to commencement of each measurement cycle and counts in the course of each measurement cycle the cycles of a clock signal CL with the frequency $f_{CL}$. The count is a measure of the time having lapsed since commencement of the measurement cycle and, for the known speed of sound, also of the distance covered by an echo pulse. The distance counter 45 is for example a 14 bit wide counter which is thus able to count 16384 cycles. The count is continually applied via a bus 46 to the echo register 30, the control circuit 33 for time-varying gain, the three fixed target circuits 34, 35, 36, the block distance register 41 and the maximum distance register 42. The count is stored in the echo register 30 when the latter receives a pulse from the comparator 25.

Via a bus 47, data can be exchanged between the gain control 31, the three fixed target circuits 34, 35, 36, the control circuit 33 for time-varying gain, the block distance register 41 and the maximum distance register 42.

Each of the three fixed target circuits 34, 35 and 36 permits handling the fixed target echo originating from a fixed target. Thus, by means of the signal processing circuit illustrated in FIG. 2 the fixed target echoes originating from the three fixed targets can each be handled separately from each other, even when the fixed target echoes overlap. In principle, any number of fixed targets may be handled by adding a further fixed target circuit for each fixed target. All fixed target circuits are configured identical, and work in identical manner and independently of each other. A fixed target circuit will now be described with reference to the detailed block diagram of FIG. 3; this description applying just the same to all other fixed target circuits.

For fixed target echo suppression, use is made of the fact that the echo signals originating from fixed targets remain unchanged over lengthy periods of time both as regards their temporal position in the measurement cycle and as regards the shape of their envelope. Accordingly, the envelopes of fixed target echoes may be recorded and stored prior to starting operation and the stored values can then be used in each measurement cycle for fixed target echo suppression. The fixed target circuit illustrated in FIG. 3 contains a fixed target memory 50 in which information as to the envelope of the fixed target echo to be suppressed are stored.

When a complete echo profile of the fixed target echo is to be stored by sampled values being taken from the echo profile at regular intervals in time, these sampled values then being digitized and the digital code words stored in their assignment to the sampling intervals, the required storage capacity is very large. In the case of the fixed target circuit of FIG. 3 another method is, therefore, employed which permits a fixed target memory 50 of very small capacity to be sufficient. This method will now be explained with reference to the timing plot of FIG. 4.

The plot in FIG. 4 shows the time profile of the envelope F of a fixed target echo as obtained at the output of the low pass filter 24, the time scale of which on the abscissa of the plot is the number of cycles of the clock signal CL as counted by the distance counter 45, whilst the amplitude scale on the ordinate of the plot is the number of steps in gain in which the amplifier 21 is adjustable. As already mentioned the gain is adjustable in 64 steps which are numbered from 0 to 63.

Placed around the envelope F in FIG. 4 is a broken line L made up of four straight segments S1, S2, S3, S4 required to hug the envelope F as closely as possible. At the corner points of each segment the coordinates are given in the scales as explained above:

Segment S1 begins at the cycle 1440 of the clock signal CL and at the gain step 0, and it ends at the cycle 1840 and the gain step 40. It thus corresponds to an increase of 40 gain steps in a period of 400 cycles of the clock signal CL.

Segment S2 begins at the end point of the segment S1 and ends at the cycle 2020 and the gain step 46. This corresponds to an increase of 6 gain steps in a period of 180 cycles of the clock signal CL.

Segment S3 begins at the end point of the segment S2 and ends at the cycle 2380 and the gain step 37. This corresponds to a decrease of 9 gain steps in a period of 360 cycles of the clock signal CL.

Segment S4 begins at the end point of the segment S3 and ends at the cycle 2676 and the gain step 0. This corresponds to a decrease of 37 gain steps in a period of 296 cycles of the clock signal CL.

Figure 3:
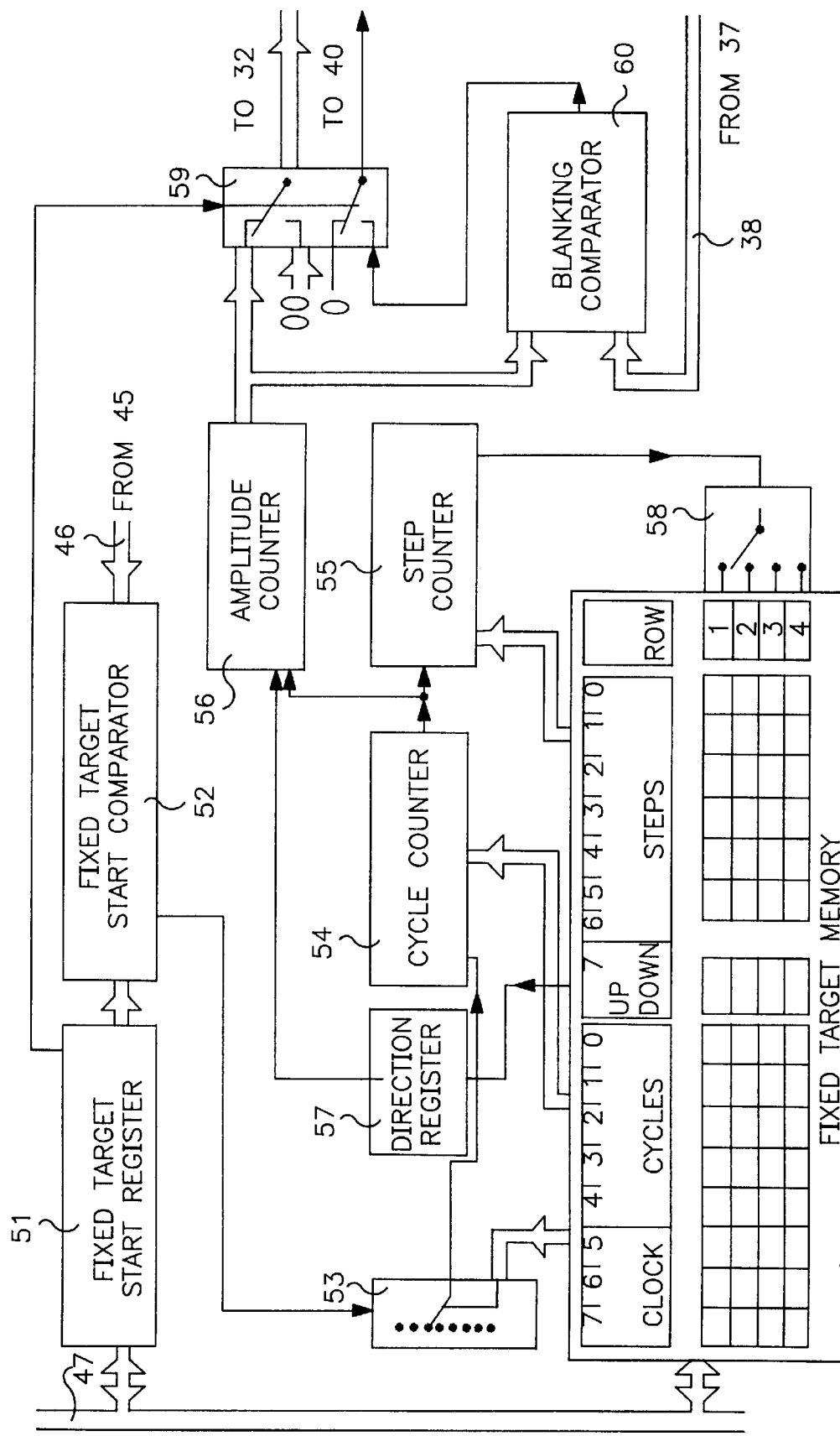
FIG. 3 is the block circuit diagram of one of the fixed target circuits in the signal processing circuit of FIG. 2

In the fixed target circuit of FIG. 3 the broken line L is used instead of the envelope F of the fixed target echo for fixed target suppression. For this purpose only information is stored which permits simulating the broken line L. Since the gain can only be changed in steps, the line L is simulated by a staircase curve in which the height of each step equals the height of one step in the gain and the duration of each step determines the slope of the rising or falling edge. The duration of each step can be given by the number of cycles of the clock signal CL; the shortest-possible duration and accordingly the steepest slope corresponding to a duration of a cycle of the clock signal CL. For the various segments in the example illustrated in FIG. 4 the resulting step duration is as follows:

for the segment S1: 400:40=10 cycles per step;
for the segment S2: 180:6=30 cycles per step;
for the segment S3: 360:9=40 cycles per step;
for the segment S4: 296:37=8 cycles per step.

To maintain the figure indicating the number of cycles per step small, in addition to the clock signal CL one of several auxiliary clock signals can be used formed by frequency division of the clock signal CL. Thus, in the fixed target circuit of FIG. 3, in addition to the clock signal CL having the frequency $f_{CL}$, six auxiliary clock signals having the frequencies $f_{CL}/2$, $f_{CL}/4$, $f_{CL}/8$, $f_{CL}/16$, $f_{CL}/32$ and $f_{CL}/64$ are available. When using an auxiliary clock signal the number of cycles to be stored is smaller; one cycle of the auxiliary clock signal, for instance, having the frequency $f_{CL}/8$ corresponding to eight cycles of the clock signal CL.

For each of the segments S1 to S4 the following information is stored in the fixed target memory 50 using the indicated number of bits:

clock frequency used: 3 bits
number of cycles per step: 5 bits
number of gain steps: 6 bits
rising or falling direction: 1 bit Thus, the storage capacity needed for storing the information of a segment is only 15 bits and that for storing the information of the complete broken line L is only 60 bits.

Accordingly, the fixed target memory 50 contains a table of 4 rows, each of which is able to store 2 bytes of 8 bits. Bits 5 to 7 of the first byte indicate the clock frequency used by one of the numbers 1 to 7. Bits 0 to 4 of the first byte indicate the duration of a step by the number of cycles of the clock frequency used, the cycle number being any number from 1 to 32. Bits 0 to 5 of the second byte indicate the number of steps of the segment concerned which may be any number from 1 to 63. Bit 6 of the second byte is not used. The binary value of bit 7 of the second byte indicates whether the segment concerned is rising or falling in direction, the binary value 1 designating rising, binary value 0 designating falling in direction.

Therefore, for the example of FIG. 4 the following information can be stored in the fixed target memory 50:

| Row | Clock | Cycles | Direction | Steps |
| --- | --- | --- | --- | --- |
| Row 1 | $f_{CL}$ | 10 | 1 | 40 |
| Row 2 | $f_{CL}$ | 30 | 1 | 6 |
| Row 3 | $f_{CL}/8$ | 5 | 0 | 9 |
| Row 4 | $f_{CL}/8$ | 1 | 0 | 37 |

In addition, a fixed target start register 51 is provided in which the starting time point of the broken line L is stored as expressed by the number of cycles of the clock signal CL from the start of the measurement cycle. In the example shown in FIG. 4 the number stored in the fixed target start register 51 is 1440. The bit width of the fixed target start register 51 needs to equal the bit width of the distance counter 45; in the example as given above the fixed target start register 51 thus needs to have a width of 14 bits for storing the fixed target starting value. However, for reasons to be explained later, an additional storage location is contained in the fixed target start register 51 for storage of one bit.

The data stored in the fixed target memory 50 and the fixed target start register 51 are entered via the bus 47, these data remaining unchanged until for some reason the fixed target echo needs to be acquired and stored anew.

The fixed target starting value stored in the fixed target start register 51 is permanently applied to the input of a fixed target start comparator 52 which at its other input continually receives the count of the distance counter 45 via the bus 46. The output of the fixed target start comparator 52 is connected to an enable input of a clock frequency selector 53, the output of the clock frequency selector 53 being connected to the clock input of the cycle counter 54. The output of the cycle counter 54 is connected to the clock input of a step counter 55 and to the clock input of an amplitude counter 56. The amplitude counter 56 is an up/down counter, the direction of counting being dictated by a signal which is applied by a direction register 57 to a count direction input. One output of the step counter 55 is connected to a control input of a row selector 58.

Via the illustrated connections the data stored in every row of the fixed target memory 50 can be entered in the clock frequency selector 53, the direction register 57, the cycle counter 54 and the step counter 55.

The portion of the fixed target circuit of FIG. 3 described so far operates in the following way:

Prior to commencement of the fixed target routine the amplitude counter 56 is set to 0, and the row selector 58 stands at row 1 of the fixed target memory 50. The sequence of the fixed target routine begins in each measurement cycle as soon as the fixed target start comparator 52 detects that the count of the distance counter 45 equals the fixed target starting value stored in the fixed target start register 51. The fixed target start comparator 52 then outputs a signal which is applied to the clock frequency selector 53 and further circuit blocks to cause the following:

the clock frequency number stored in row 1 of the fixed target memory 50 is entered in the clock frequency selector 53;

the cycle number stored in row 1 of the fixed target memory 50 is entered in the cycle counter 54;

the direction bit stored in row 1 of the fixed target memory 50 is entered in the direction register 57;

the step number stored in row 1 of the fixed target memory 50 is entered in the step counter 55.

Explaining the resulting function will now be done, using the numerical values of the example shown in FIG. 4.

The clock frequency selector 53 selects the clock frequency $f_{CL}$ as identified by the entered number and outputs pulses having this clock frequency to the cycle counter 54. The cycle counter 54 counts the cycles of this clock frequency and outputs a count pulse following each count of the cycle number entered from the memory 50. The cycle counter 54 may, for example, be a ring counter, the cycle of which is dictated by the cycle number entered from the memory 50 and which outputs a count pulse at each zero crossover. Accordingly, for the segment S1 in the cited example the cycle counter 54 furnishes after every 10 cycles of the clock frequency $f_{CL}$ a count pulse to the step counter 55 and to the amplitude counter 56. The step counter 55 is a down counter, the count of which has been set to the step number 40 entered from the fixed target memory 50 and is counted down one step at a time by each count pulse output from the cycle counter 54. The amplitude counter 56 is incremented in the count direction by each count pulse output by the cycle counter 54, this direction being dictated by the direction bit held in the direction register 57. Since the direction bit held in row 1 has the binary value 1, the count of the amplitude counter 56 is elevated incrementally.

The step counter 55 achieves the count 0 when it has received 40 count pulses from the cycle counter 54, this being the case when 400 cycles of the clock signal CL have been received. Thus, the count of the amplitude counter 56 in the on-going measurement cycle has been incrementally elevated from the value 0 at time 1440 to the value 40 at time 1840; this corresponding precisely to the linear temporal profile of the segment S1 in FIG. 4.

On attaining the count 0 the step counter 55 furnishes a pulse to the row selector 58, as a result of which it progresses to the next row 2. Now, the data held in row 2 is entered in the circuit blocks 53, 57, 54 and 55 and the procedure as already described for row 1 is repeated with the new values. The frequency selector 53 continues to furnish pulses having the clock frequency $f_{CL}$ to the cycle counter 54 which now outputs after every 30 cycles of this clock frequency a count pulse to the step counter 55 and the amplitude counter 56. Every count pulse decrements the step counter 55 by one step from the starting count 6, and the count of the amplitude counter 56 continues to be incremented by one step by each count pulse. The step counter 55 attains the count 0 after 6 count pulses, i.e. following 180 cycles of the clock signal CL, at time 2020 of the measurement cycle and, at the same time, the amplitude counter 56 has attained the count 56. This incremental increase in the count of the amplitude counter 56 thus corresponds precisely to the time profile of segment S2 in FIG. 4.

On attaining the count 0 the step counter 55 switches the row selector 58 to select row 3, as a result of which the data stored in this row is entered in the blocks 53, 57, 54 and 55, upon which the procedure as described is repeated with the new values. The frequency selector 53 now furnishes pulses having the auxiliary clock frequency $f_{CL}/8$ to the cycle counter 54 which furnishes after every 5 cycles of this auxiliary clock frequency a count pulse to the step counter 55 and to the amplitude counter 56. The step counter 55 is decremented by every count pulse by one step from the starting count 9. The count of the amplitude counter 56 is now diminished by every count pulse by one step since the direction bit held in the direction register 57 has the binary value 0. After 9 count pulses from the cycle counter 54, the step counter 55 attains the count 0. This is the case after 45 cycles of the auxiliary clock frequency $f_{CL}/8$ which corresponds to 360 cycles of the clock frequency $f_{CL}$. At the same time, i.e. at time 2380 of the measurement cycle, the amplitude counter 56 has attained the count 37 which precisely corresponds to the time profile of the segment S3 in FIG. 4.

The same procedure is then repeated with the data held in row 4 of the fixed target memory 50. The frequency selector 53 continues to furnish pulses having the clock frequency $f_{CL}/8$ to the cycle counter 54 which now outputs for each of these clock pulses a count pulse. The step counter 55 is decremented by the clock pulses from the starting count 37, and the count of the amplitude counter 56 is decremented by each count pulse. After 37 count pulses both the step counter 55 and the amplitude counter 56 attain the count 0. This is the case after 37 cycles of the clock frequency $f_{CL}/8$, i.e. after 296 cycles of the clock frequency $f_{CL}$ at time 2676 of the measurement cycle. Thus, the contents of the fixed target memory 50 have been processed, and the fixed target routine for this fixed target circuit has been completed.

It will thus be appreciated that the count of the amplitude counter 56 in the course of the measurement cycle always corresponds to the amplitude value of the broken line L, expressed by the number of gain steps of the amplifier 21. This count can be made use of in two different modes for achieving a fixed target echo suppression. Selecting the mode is determined by an additional bit in the fixed target start register 51 and is achieved by correspondingly setting a selector switch 59. These two modes will now be explained in the following.

Mode 1: Gain Control

Mode 1 is set when the additional bit in the fixed target start register 51 has the binary value 1. In this mode the selector switch 59 assumes the position shown in FIG. 3. In this position it connects the output of the amplitude counter 56 to the input of the maximum value detector 32 so that the current count of the amplitude counter 56 is transferred as a data word to the maximum value detector 32. This transfer is ineffective as long as other data words supplied to the maximum value detector 32 have a higher numerical value. However, as soon as the count of the amplitude counter 56 is greater than the numerical value of all other data words supplied to the maximum value detector 32, the count of the amplitude counter 56 dictates the gain setting of the amplifier 21. In the latter case, the gain is changed with every change in the count of the amplitude counter 56 by one step so that the amplitude of the broken line L always remains below the threshold value of the comparator 25. As a result of this, all signals are also supressed which are located in the surface area below the broken line L, this including the envelope F of the fixed target echo. But a useful echo pulse which is superimposed on the fixed target echo such that it exceeds the broken line L, is detected by the comparator 25.

In this position of the selector switch 59 a blanking signal of the binary value 0 is continuously applied to a conductor leading from the selector switch 59 to the blanking circuit 40.

Mode 2: Blanking

In mode 2, which is dictated by the binary value 0 of the additional bit in the fixed target start register 51, the selector switch 59 is signalled into the other position. For this mode a blanking comparator 60 is provided which receives at one input the current count of the amplitude counter 56 and at the other input, via the bus 38, the data word held in the gain register 37. The blanking comparator 60 outputs a binary signal having the binary value 0 when the count of the amplitude counter 56 is smaller than the numerical value of the data word held in the gain register 37 and which in the other case outputs the binary value 1. This binary signal is supplied via the selector switch 59 to the blanking circuit 40 which opens the enable switch 26 when the binary signal has the binary value 1. Thus, evaluation of the envelope signal furnished by the analog subcircuit 20 is prevented during the time interval when the count of the amplitude counter 56 is greater than the numerical values of all other gain data words supplied to the maximum value detector 32, i.e. in the time interval in which in mode 1 the gain setting of the amplifier 21 would be dictated by the count of the amplitude counter 56.

In mode 2 the connection between the output of the amplitude counter 56 and the associated input of the maximum value detector 32 is open-circuited; a data word having a 0 value being applied continuously to this input of the maximum value detector 32.

The selector switch 59, which is illustrated in FIG. 3 symbolically by two mechanical change-over contacts, contains of course in reality in the connection between the amplitude counter 56 and the maximum value detector 32 a group of fast electronic change-over switches as well as a further fast electronic change-over switch in the connection between the blanking comparator 60 and the blanking circuit 40.

The broken line L always commences with the amplitude 0, since the amplitude counter 56 is set to 0 to start with. It is not, however, absolutely necessary that the line L also ends with the amplitude 0 as is the case in the example shown in FIG. 4. When the last segment is defined so that it ends at a negative amplitude, the amplitude counter 56 halts on attaining the count 0. If the last segment is defined so that it ends at a positive amplitude other than 0, the amplitude counter 56 halts at the count corresponding to this positive amplitude.

The broken line L may also comprise more than four segments; this then neccessitaing the addition of a row in the table in the fixed target memory 50 for each further segment. Experience has shown, however, that in actual practice any fixed target echo can be approximated with sufficient accuracy by a broken line L made up of four segments.

It will be appreciated that although the invention has been described by way of example for the case of distance measuring with ultrasonic waves, it can be put to use just as well also in the case of distance measuring with electromagnetic waves.

I claim:

1. A method for suppressing fixed target echoes when measuring a distance based on the principle of pulse transit time in which each measurement cycle of the distance measurement consists of a transmitting phase and a receiving phase, in the transmitting phase a transmission pulse having a given transmission frequency is emitted and in the subsequent receiving phase an envelope of the received signals with the given transmission frequency is formed to determine the transit time of an useful echo pulse and to compute therefrom the distance to be measured, and wherein, prior to the measurement cycle, information relating to the fixed target echoes is acquired and stored for use in each measurement cycle for suppressing the fixed target echoes, said method comprising the following steps:

forming a broken line including a first segment and several additional segments which surround an envelope of a fixed target echo to acquire the information related to the fixed target echo;

for each segment, storing information as to the segment end point amplitude, the segment direction and the segment slope and for the first segment, information as to the start time of the first segment in the measurement cycle;

during each measurement cycle, starting with the start time of the first segment, a current count of counting pulses is kept, where for each segment counting pulses having a repetition frequency dictated by the segment slope information are counted in a counting direction dictated by the segment direction information until the current count reaches a value dictated by the segment endpoint amplitude information;

during each measurement cycle, using the current count to control fixed target echo suppression.

2. The method as set forth in claim 1, wherein the gain of an amplifier amplifying the received signals is adjusted as a function of the current count during the measurement cycle so that the amplitude of an envelope signal corresponding to the broken line does not exceed a given threshold value.

3. The method as set forth in claim 1, wherein the evaluation of the envelope of the received signal as a function of the current count during the measurement cycle is blocked in a time span in which the amplitude of an envelope signal corresponding to the broken line exceeds a given threshold value.

4. The method as set forth in claim 1, wherein the counting pulses correspond to an amplitude step, the segment end point amplitude information is stored as a number of amplitude steps, and the segment slope information is stored as a duration of an amplitude step.

5. The method as set forth in claim 4, wherein the information for the duration of an amplitude step includes a clock frequency and a cycle number for the clock frequency such that, in each measurement cycle, the cycles of the clock frequency are counted and the current count adjusted after each count of the cycle number for the clock frequency.

6. An apparatus for distance measurement based on the principle of pulse transit time that suppresses fixed target echoes from fixed targets during a measurement cycle, comprising means for emitting a transmission pulse in a transmitting phase of each measurement cycle and a signal processing circuit for processing received signals received in a receiving phase following the transmitting phase of each measurement cycle, said signal processing circuit containing an analog subcircuit for amplifying and filtering the received signals and for forming an envelope of the received signals, and said signal processing circuit containing a distance counter, which during the measurement cycle, continuously counts the cycles of a clock signal to measure time elapsed since the commencement of the measurement cycle, wherein prior to the measurement cycle, information describing each fixed target echo is acquired and stored as a broken line consisting of a first segment and subsequent segments which surround the fixed target echo, said signal processing circuit includes, for each fixed target echo to be suppressed, a fixed target circuit containing a fixed target memory in which fixed target echo amplitude information, fixed target echo direction information and fixed target echo slope information are stored for all segments of the broken line in a table which contains a row for each segment, and each fixed target circuit contains a fixed target start register storing information as to the start time of the first segment in the measurement cycle, each fixed target circuit also contains a fixed target start comparator which continuously compares the information stored in the fixed target start register to the count of the distance counter and which on detecting equality activates row-by-row processing of the information stored in the fixed target memory.

7. The apparatus as set forth in claim 6, wherein each fixed target circuit contains a row selector, a clock frequency selector, a cycle counter, a step counter, and an amplitude counter; the row selector selects, in sequence, each row of the table held in the fixed target memory, each row of the fixed target memory containing a selected clock frequency, a cycle number, a direction indicator, and a step number; the clock frequency selector includes an output providing a timing signal having the selected clock frequency held in the selected row; the cycle counter counts the cycles of the timing signal and includes an output providing a count pulse after every count of the cycle number held in the selected row; the step counter counts the count pulses and after every count of the step number held in the selected row advances the row selector to the next row of the fixed target memory; the amplitude counter counts the count pulses of the cycle counter in the count direction dictated by the direction indicator in the selected row.

8. The apparatus as set forth in claim 7, wherein said analog subcircuit in said signal processing circuit contains an amplifier for the received signals, the gain of said amplifier being adjustable according to a data word held in a gain register, said signal processing circuit includes a maximum value detector which receives data words at several inputs from various sources and has an output providing the data word having the highest numerical value to the gain register, said maximum value detector has an input for each fixed target circuit which is connectable to the output of the amplitude counter of the fixed target circuit, so that the count of the amplitude counter is entered as a data word.

9. The apparatus as set forth in claim 8, wherein said signal processing circuit includes a blanking circuit which on receiving a blanking signal interrupts the evaluation of the envelope of the received signals for the duration of the blanking signal, and wherein each fixed target circuit contains a blanking comparator which compares the count of the amplitude counter continuously with the data word held in the gain register and which includes an output providing a blanking signal when the count of the amplitude counter equals or exceeds the numerical value of the data word held in the gain register, the output of the blanking comparator being connectable to the blanking circuit.

10. The apparatus as set forth in claim 9, wherein each fixed target circuit contains a selector switch which in a first position connects the amplitude counter to the associated input of the maximum value detector and disconnects the blanking comparator from the blanking circuit, and which in a second position connects the blanking comparator to the blanking circuit and disconnects the amplitude counter from the associated input of the maximum value detector.

11. The apparatus as set forth in claim 10, wherein the position of the selector switch is dictated by a bit held in the fixed target start register.

* * * * *

UNITED STATES PATENT AND TRADEMARK OFFICE
CERTIFICATE OF CORRECTION

PATENT NO. : 5,822,275
DATED : October 13, 1998
INVENTOR(S) : Bernhard Michalski It is certified that error appears in the above-identified patent and that said Letters Patent is hereby corrected as shown below:

```
Title page, item [73],
```

Under "Assignee", please correct the Assignee's name from "Endress & Hauser GmbH & Co." to --Endress + Hauser GmbH + Co. --.

Signed and Sealed this

Twelfth Day of January, 1999

Attest:

*Attesting Officer*    *Acting Commissioner of Patents and Trademarks*